US012638198B2

(12) United States Patent
Li

(10) Patent No.: US 12,638,198 B2
(45) Date of Patent: May 26, 2026

(54) VOLCANO TYPE AROMATHERAPY HUMIDIFIER

(71) Applicant: Changchun Li, Ganzhou (CN)

(72) Inventor: Changchun Li, Ganzhou (CN)

( * ) Notice: Subject to any disclaimer, the term of this patent is extended or adjusted under 35 U.S.C. 154(b) by 2 days.

(21) Appl. No.: 18/564,702

(22) PCT Filed: Oct. 20, 2022

(86) PCT No.: PCT/CN2022/126369

§ 371 (c)(1),
(2) Date: Nov. 28, 2023

(87) PCT Pub. No.: WO2023/184938

PCT Pub. Date: Oct. 5, 2023

(65) Prior Publication Data

US 2024/0271806 A1 Aug. 15, 2024

(30) Foreign Application Priority Data

Mar. 26, 2022 (CN) ........................ 202220659165.X

(51) Int. Cl.
*F24F 8/00* (2021.01)
*F21S 10/04* (2006.01)
(Continued)

(52) U.S. Cl.
CPC ................ *F24F 8/50* (2021.01); *F21S 10/04* (2013.01); *F24F 6/12* (2013.01); *F24F 13/078* (2013.01); *F21Y 2115/10* (2016.08)

(58) Field of Classification Search
CPC .... F24F 8/50; F24F 6/12; F24F 13/078; F24F 11/89; F24F 13/20; F24F 2013/205;
(Continued)

(56) References Cited

U.S. PATENT DOCUMENTS 6,135,604 A * 10/2000 Lin ...................... H05B 47/155
362/101
2007/0035044 A1 * 2/2007 Chiu ................... B05B 17/0615
261/81

(Continued)

*Primary Examiner* — T. Bennett McKenzie
(74) *Attorney, Agent, or Firm* — Hemisphere Law, PLLC

(57) ABSTRACT

The present disclosure provides a volcano type aromatherapy humidifier, including a humidifier main unit body, a control circuit board arranged inside the humidifier main unit body, an atomization module, and a fan blade assembly, wherein a mist ring spray outlet for spraying a vortex mist ring and a flame spray port for forming a similar flame spray shape are formed in an upper part of the humidifier main unit body; the flame spray port is arranged circumferentially on an outer side of the mist ring spray outlet; the fan blade assembly includes a driving motor and a fan blade connected to an output shaft of the driving motor; and the fan blade is arranged close to an inner side of the mist ring spray outlet and is configured to extrude mist out of the mist ring spray outlet during instantaneous rotation at a high speed to form a vortex mist ring. In an actual application process, spraying of a vortex mist ring and flame spray can be better achieved through operation states of the mist ring spray outlet, the flame spray port, and the fan blade assembly, and the use experience and the ornamenting value are high.

9 Claims, 4 Drawing Sheets

(51) Int. Cl.

| | |
|---|---|
| ***F24F 6/12*** | (2006.01) |
| ***F24F 8/50*** | (2021.01) |
| ***F24F 13/078*** | (2006.01) |
| *F21Y 115/10* | (2016.01) |

(58) Field of Classification Search
CPC ... F24F 2221/02; F21S 10/04; F21Y 2115/10; Y02B 30/70; F21V 33/00
USPC ............................................................ 96/222
See application file for complete search history.

(56) References Cited

U.S. PATENT DOCUMENTS

| | | | | |
|---|---|---|---|---|
| 2014/0097550 A1* | 4/2014 | Jiang | F24F 6/18 261/119.1 |
| 2015/0153058 A1* | 6/2015 | Chen | F24F 11/30 261/129 |
| 2017/0023268 A1* | 1/2017 | Chan | F24F 13/26 |
| 2020/0222575 A1* | 7/2020 | Rigby | A61L 9/03 |
| 2023/0175716 A1* | 6/2023 | Liu | F21S 10/04 362/96 |
| 2023/0296282 A1* | 9/2023 | Gray | F21S 10/04 392/394 |

* cited by examiner

VOLCANO TYPE AROMATHERAPY HUMIDIFIER

TECHNICAL FIELD

The present disclosure relates to the technical field of humidifier products, and in particular, to a volcano type aromatherapy humidifier with a reasonable structural design and an outstanding application effect.

BACKGROUND

A humidifier is a household appliance that increases a humidity of a room. The humidifier can humidify a designated room or can be connected to a boiler or central air conditioning system to humidify an entire building.

The humidifier industry has been developed for nearly 20 years in China. After years of popularization of air quality concepts, product research and development, and market cultivation, the function and effect of a humidifier that is a relatively unfamiliar small household appliance product have gradually been accepted.

According to an existing humidifier product, intermittent opening and closing of a movable cover are usually used to press mist in an atomization chamber to be sprayed out from an opening of the movable cover to form a mist ring. This structure has some problems of instability, low flexibility, poor mist ring spraying effect, and noise, which is not conducive to better promotion and application of a product, and this structure also has a single display effect, insufficient diversification of functions, and poor experience.

Based on this, a person skilled in the art improves specific construction parts of the humidifier product and makes good achievements.

SUMMARY

In order to overcome the problems in the prior art, the present disclosure provides a volcano type aromatherapy humidifier with a reasonable structural design, an outstanding application effect, and a good display effect.

Solutions of the present disclosure for solving the technical problems are as follows:

- A volcano type aromatherapy humidifier is provided, including a humidifier main unit body, a control circuit board arranged inside the humidifier main unit body, an atomization module, and a fan blade assembly, wherein a mist ring spray outlet for spraying a vortex mist ring and a flame spray port for forming a similar flame spray shape are formed in an upper part of the humidifier main unit body;
- the flame spray port is arranged circumferentially on an outer side of the mist ring spray outlet;
- the fan blade assembly includes a driving motor and a fan blade connected to an output shaft of the driving motor;
- the fan blade is arranged close to an inner side of the mist ring spray outlet and is configured to extrude mist out of the mist ring spray outlet during instantaneous rotation at a high speed to form a vortex mist ring; and
- the atomization module, the fan blade assembly, and the control circuit board are electrically connected to each other.

Preferably, the upper part and/or a side wall of the humidifier main unit body are all or partially of a transparent or semi-transparent structure;

light-emitting diodes (LEDs) are attached to the control circuit board or an LED lamp for light emission is arranged inside the humidifier main unit body to form a flame spray effect together with spray at the flame spray port.

Preferably, the flame spray port is arranged circumferentially on the outer side of the mist ring spray outlet; the mist ring spray outlet is of a convex opening structure; and the flame spray port is of a concave opening structure.

Preferably, an air guide wall for guiding air is arranged circumferentially on the inner side of the mist ring spray outlet, and the fan blade is located on an inner side of the air guide wall.

Preferably, a sprayed mist guide bone for making mist sprayed out vertically upwards is arranged on the inner side of the flame spray port.

Preferably, the humidifier main unit body includes an outer shell, an inner container located inside the outer shell, an air guide cover located at an upper part of the inner container, and an upper housing arranged at an upper part of the air guide cover;

the air guide cover is matched with a shape of the upper housing;

the upper housing is provided with a first opening and a second opening; the air guide cover is provided with a third opening and a fourth opening; the first opening is correspondingly matched with the third opening to form the mist ring spray outlet; the second opening is correspondingly matched with the fourth opening to form the flame spray port; and the atomization module is located at a bottom of the inner container.

Preferably, a motor compartment for accommodating the driving motor is further integrally molded in the inner container; and the control circuit board is located in an internal space enclosed by a bottom of the outer shell and the bottom of the inner container.

Preferably, an inner side of the air guide cover protrudes towards an upper side to form a first spherical protrusion; the third opening is formed at a top of the first spherical protrusion; the upper housing is also provided with a second spherical protrusion that is matched with the first spherical protrusion; and the first opening is formed in a top of the second spherical protrusion.

Preferably, the fourth opening is a through hole with a size smaller than a size of the first opening and a size of the third opening; and the fourth opening is arranged circumferentially on an outer side of the third opening.

Preferably, the humidifier main unit body is of a cylindrical structure as a whole.

Technical effects achieved by solving the technical problems by the present disclosure are as follows:

Compared with the prior art, the volcano type aromatherapy humidifier of the present disclosure includes a humidifier main unit body, a control circuit board 13 arranged inside the humidifier main unit body, an atomization module 14, and a fan blade assembly; a mist ring spray outlet for spraying a vortex mist ring and a flame spray port for forming a similar flame spray shape are formed in an upper part of the humidifier main unit body; the flame spray port is arranged circumferentially on an outer side of the mist ring spray outlet; the fan blade assembly includes a driving motor 12 and a fan blade 121 connected to an output shaft of the driving motor 12; the fan blade 121 is arranged close to an inner side of the mist ring spray outlet and is configured to extrude mist out of the mist ring spray outlet during instantaneous rotation at a high speed to form a vortex mist ring; and the atomization module 14, the fan blade assembly, and the control circuit board 13 are electrically connected to each other. In an actual application process, spraying of a vortex mist ring and flame spray can be better achieved through operation states of the mist ring spray outlet, the flame spray port, and the fan blade assembly, and the use experience and the ornamenting value are high.

DETAILED DESCRIPTION OF THE EMBODIMENTS

In order to make the objectives, technical solutions, and advantages of the present disclosure clearer, the following is a further detailed explanation of the present disclosure in conjunction with the accompanying drawings and embodiments.

It should be understood that the specific embodiments described here are only intended to explain the present disclosure and are not intended to limit the present disclosure.

All other embodiments obtained by a person of ordinary skill in the art based on the embodiments of the present disclosure without making creative efforts shall fall within the protection scope of the present disclosure.

It should be noted that when an assembly is referred to as being "fixed" to another assembly, the assembly can be directly on the another assembly or there can be an intermediate assembly. When an assembly is considered to be "connected" to another assembly, the assembly can be directly connected to the another assembly or there may be an intermediate assembly.

Unless otherwise defined, all technical and scientific terms used herein have the same meaning as those commonly understood by a person skilled in the art to which the present disclosure belongs.

Terms used in the specification of the present disclosure herein are merely intended to describe objectives of the specific embodiments, but are not intended to limit the present disclosure. The term "and/or" used herein includes any and all combinations of one or more related listed items.

Some implementations of the present disclosure will be explained in detail below in conjunction with the accompanying drawings. The following embodiments and features of the embodiments may be combined with each other without conflict.

Figure 1:
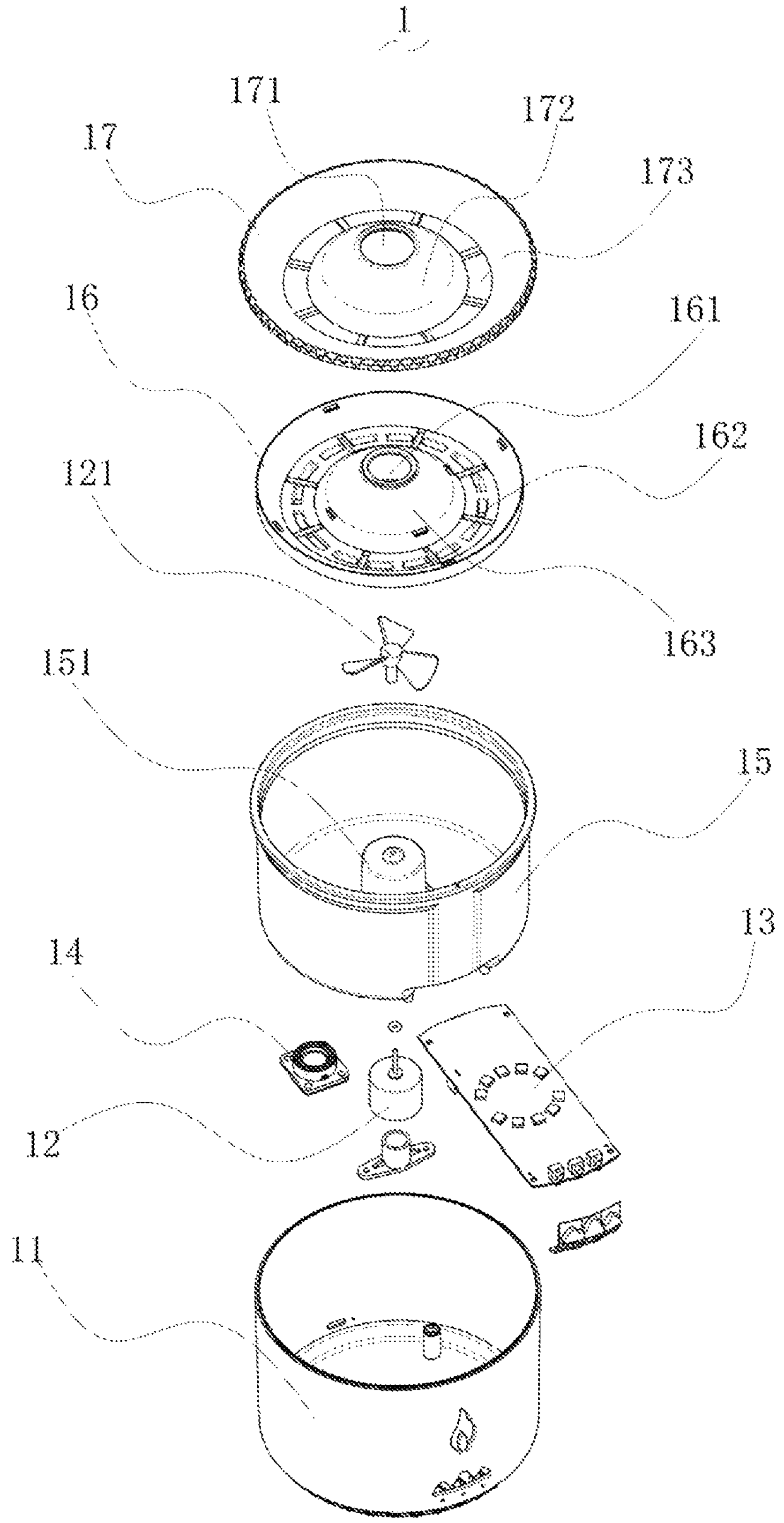
FIG. 1 is a schematic structural diagram of an exploded state of a volcano type aromatherapy humidifier according to the present disclosure.
Figure 2:
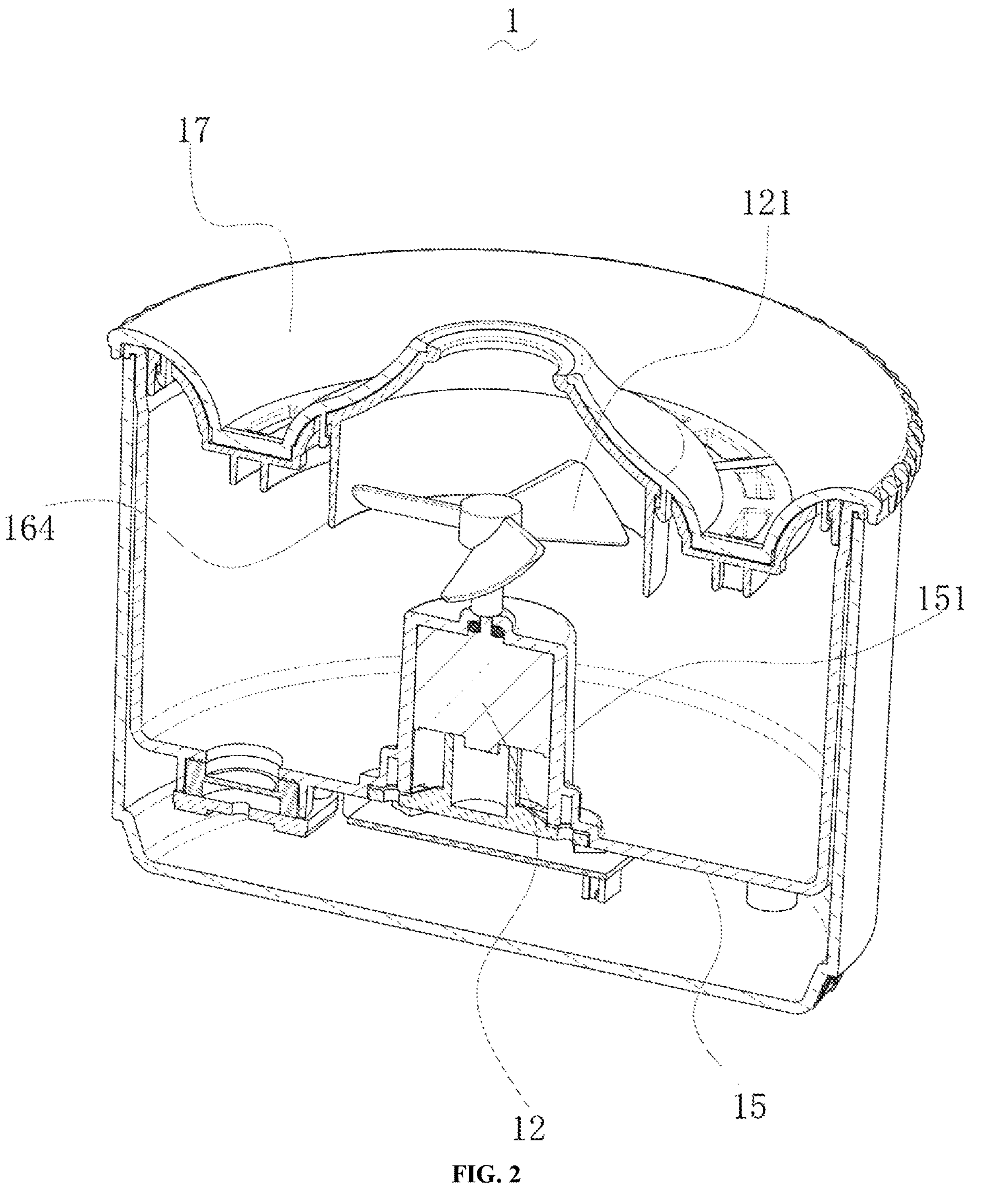
FIG. 2 is a schematic structural diagram of a cut-away state of a volcano type aromatherapy humidifier according to the present disclosure.
Figure 3:
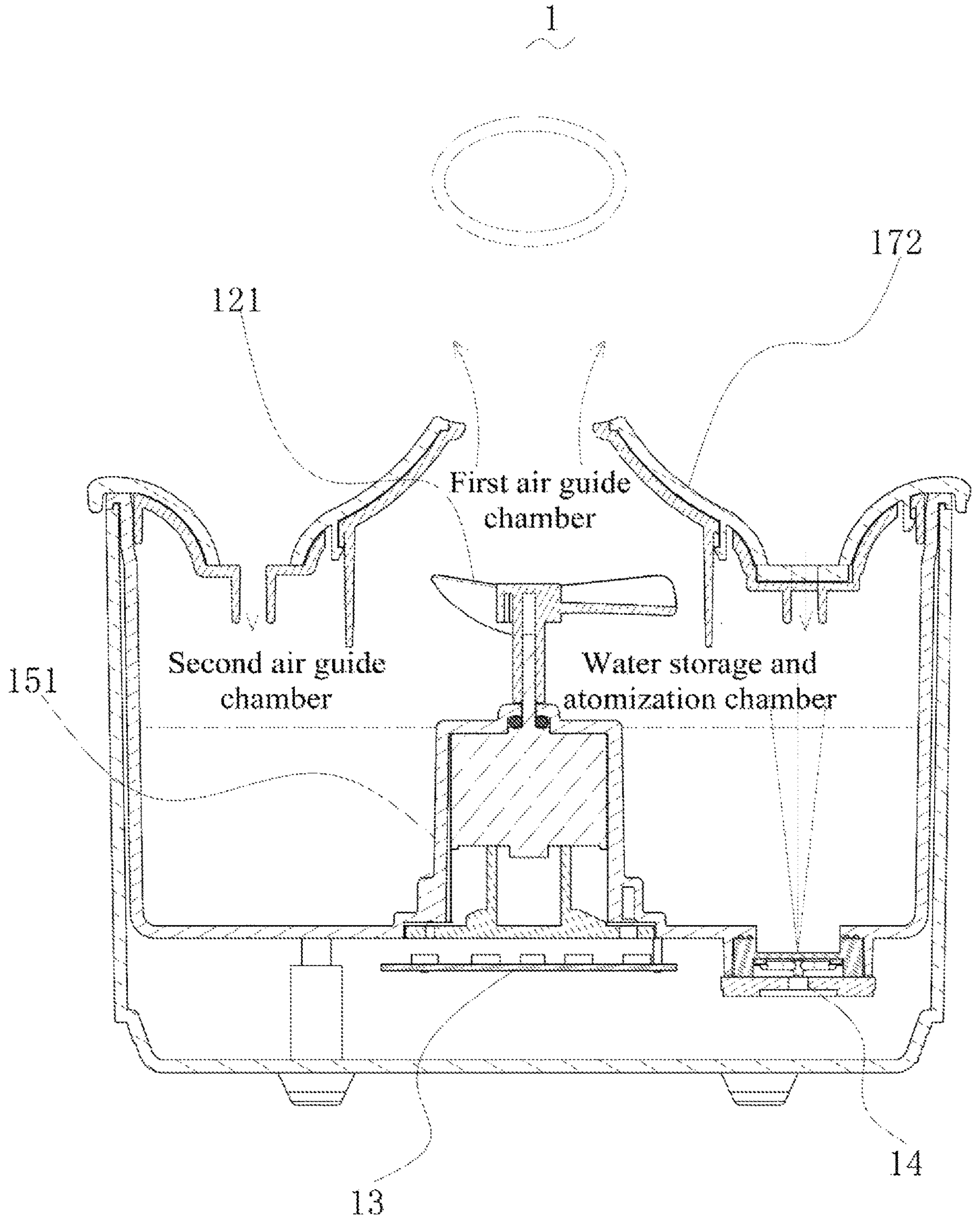
FIG. 3 and FIG. 4 are schematic structural diagrams of a sectional state of a volcano type aromatherapy humidifier according to the present disclosure.
Figure 4:
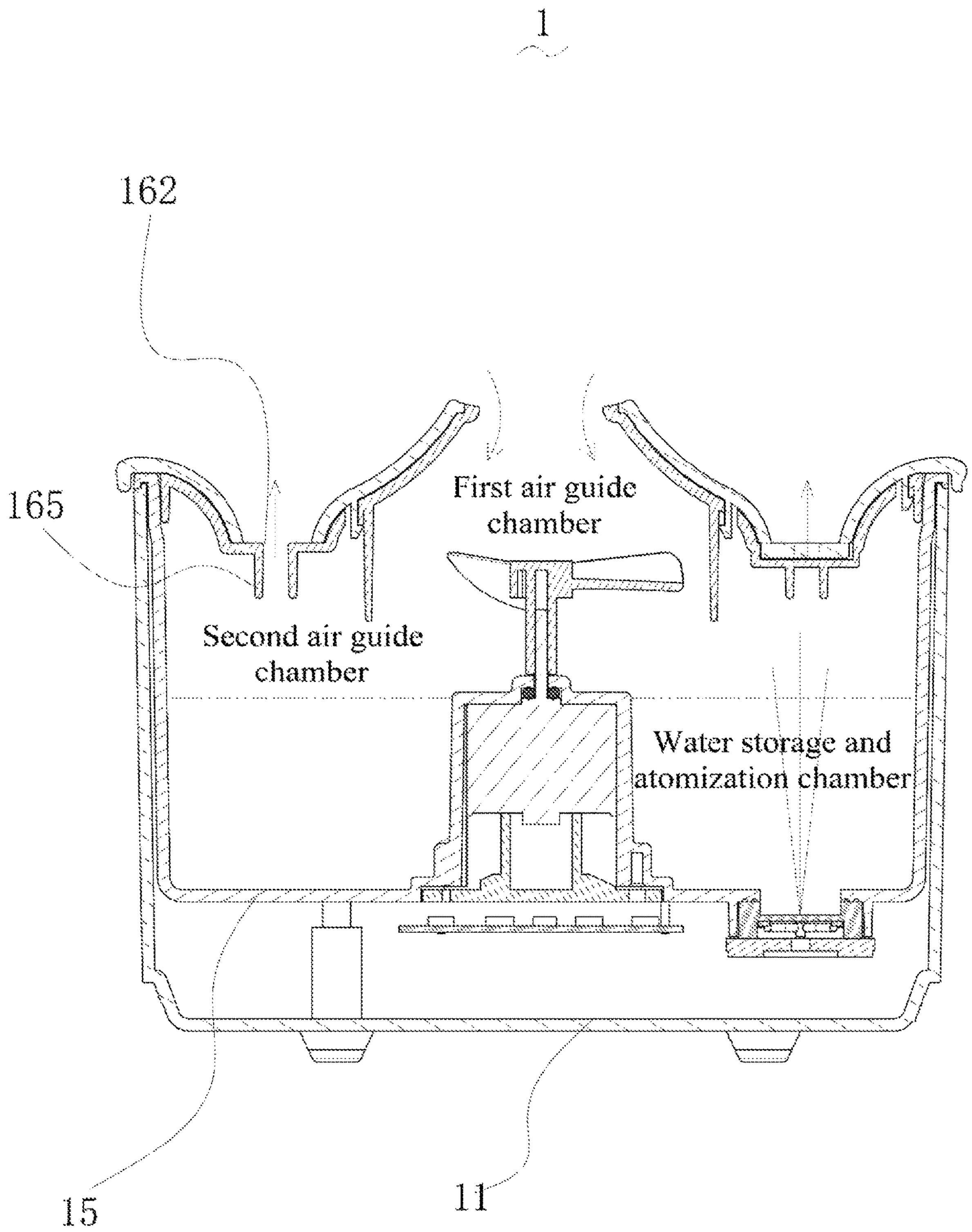

Referring to FIG. 1 to FIG. 4, a volcano type aromatherapy humidifier 1 of the present disclosure includes a humidifier main unit body, a control circuit board 13 arranged inside the humidifier main unit body, an atomization module 14, and a fan blade assembly; a mist ring spray outlet for spraying a vortex mist ring and a flame spray port for forming a similar flame spray shape are formed in an upper part of the humidifier main unit body;

the flame spray port is arranged circumferentially on an outer side of the mist ring spray outlet;

the fan blade assembly includes a driving motor 12 and a fan blade 121 connected to an output shaft of the driving motor 12;

the fan blade 121 is arranged close to an inner side of the mist ring spray outlet and is configured to extrude mist out of the mist ring spray outlet during instantaneous rotation at a high speed to form a vortex mist ring; and the atomization module 14, the fan blade assembly, and the control circuit board 13 are electrically connected to each other.

According to the present disclosure, the volcano type aromatherapy humidifier includes a humidifier main unit body, a control circuit board 13 arranged inside the humidifier main unit body, an atomization module 14, and a fan blade assembly; a mist ring spray outlet for spraying a vortex mist ring and a flame spray port for forming a similar flame spray shape are formed in an upper part of the humidifier main unit body; the flame spray port is arranged circumferentially on an outer side of the mist ring spray outlet; the fan blade assembly includes a driving motor 12 and a fan blade 121 connected to an output shaft of the driving motor 12; the fan blade 121 is arranged close to an inner side of the mist ring spray outlet and is configured to extrude mist out of the mist ring spray outlet during instantaneous rotation at a high speed to form a vortex mist ring; and the atomization module 14, the fan blade assembly, and the control circuit board 13 are electrically connected to each other. In an actual application process, spraying of a vortex mist ring and flame spray can be better achieved through operation states of the mist ring spray outlet, the flame spray port, and the fan blade assembly, and the use experience and the ornamenting value are high.

The present disclosure does not involve an improvement on a circuit part, and all functional components are conventional technical components in the art and are familiar to those skilled in the art. The present disclosure mainly protects an internal structure of the humidifier, as well as a specific layout and structural characteristics of spray openings and the fan blade 121.

In practical operations, there are two modes below:

First: The driving motor 12 drives the fan blade 121 to instantaneously rotate at a high speed and immediately stop, so that an air guide chamber on the inner side of the mist ring spray outlet is instantly pressed to extrude mist out of the mist ring spray outlet to form a vortex mist ring. An air pressure in an air guide chamber on the inner side of the flame spray port forms a negative pressure with the rotation of the fan blade 121, and external air is instantly replenished from the flame spray port, so that the internal air pressure of the air guide chamber is balanced with an external air pressure.

Secondly: The driving motor 12 drives the fan blade 121 to rotate continuously at a certain speed in a reverse direction, and the external air continues to be supplied from the mist ring spray outlet via the air guide chamber on the inner side of the mist ring spray outlet to the air guide chamber on the inner side of the flame spray port. The air guide chamber is continuously pressed to extrude mist out of the flame spray port part. Under a light effect, it looks like a flame and achieves a good ornamenting value.

Further, the upper part and/or a side wall of the humidifier main unit body are all or partially of a transparent or semi-transparent structure.

LEDs are attached to the control circuit board 13 or an LED lamp for light emission is arranged inside the humidifier main unit body to form a flame spray effect together with spray at the flame spray port.

Due to the transparent or semi-transparent structure, a flame-like effect can be formed effectively with spray, so that the ornamenting value is high.

In a preferable embodiment, the flame spray port is arranged circumferentially on the outer side of the mist ring spray outlet; the mist ring spray outlet is of a convex opening structure; and the flame spray port is of a concave opening structure.

In addition, an air guide wall 164 for guiding air is arranged circumferentially on the inner side of the mist ring spray outlet, and the fan blade 121 is located on an inner side of the air guide wall 164.

Due to the arrangement of the air guide wall 164, it is more favorable for stable transportation of the mist in the humidifier main unit body, which improves the integrity of sprayed mist rings.

Further, a sprayed mist guide bone 165 for making mist sprayed out vertically upwards is arranged on the inner side of the flame spray port.

In a preferable embodiment, the humidifier main unit body includes an outer shell 11, an inner container 15 located inside the outer shell 11, an air guide cover 16 located at an upper part of the inner container 15, and an upper housing 17 arranged at an upper part of the air guide cover 16.

The air guide cover 16 is matched with a shape of the upper housing 17.

The upper housing 17 is provided with a first opening 171 and a second opening 173; the air guide cover 16 is provided with a third opening 161 and a fourth opening 162; the first opening 171 is correspondingly matched with the third opening 161 to form the mist ring spray outlet; and the second opening 173 is correspondingly matched with the fourth opening 162 to form the flame spray port.

The atomization module 14 is located at a bottom of the inner container 15.

Further, a motor compartment 151 for accommodating the driving motor 12 is further integrally molded in the inner container 15.

The control circuit board 13 is located in an internal space enclosed by a bottom of the outer shell 11 and the bottom of the inner container 15.

In a preferable embodiment, an inner side of the air guide cover 16 protrudes towards an upper side to form a first spherical protrusion 163; the third opening 161 is formed at a top of the first spherical protrusion 163; the upper housing 17 is also provided with a second spherical protrusion 172 that is matched with the first spherical protrusion 163; and the first opening 171 is formed in a top of the second spherical protrusion 172.

Further, the fourth opening 162 is a through hole with a size smaller than a size of the first opening 171 and a size of the third opening 161.

The fourth opening 162 is arranged circumferentially on an outer side of the third opening 161.

In a preferable embodiment, the humidifier main unit body is of a cylindrical structure as a whole.

Compared with the prior art, the volcano type aromatherapy humidifier 1 of the present disclosure includes a humidifier main unit body, a control circuit board 13 arranged inside the humidifier main unit body, an atomization module 14, and a fan blade assembly; a mist ring spray outlet for spraying a vortex mist ring and a flame spray port for forming a similar flame spray shape are formed in an upper part of the humidifier main unit body; the flame spray port is arranged circumferentially on an outer side of the mist ring spray outlet; the fan blade assembly includes a driving motor 12 and a fan blade 121 connected to an output shaft of the driving motor 12; the fan blade 121 is arranged close to an inner side of the mist ring spray outlet and is configured to extrude mist out of the mist ring spray outlet during instantaneous rotation at a high speed to form a vortex mist ring; and the atomization module 14, the fan blade assembly, and the control circuit board 13 are electrically connected to each other. In an actual application process, spraying of a vortex mist ring and flame spry can be better achieved through operation states of the mist ring spray outlet, the flame spray port, and the fan blade assembly, and the use experience and the ornamenting value are high.

The above implementations of the present disclosure do not constitute a limitation on the scope of protection of the present disclosure. Any modification, equivalent replacement, and improvement made within the spirit and scope of the present disclosure shall fall within the scope of protection of the claims of the present disclosure.

What is claimed is:

1. An aromatherapy humidifier, comprising a humidifier main unit body, a control circuit board arranged inside the humidifier main unit body, an atomization module, and a fan blade assembly, wherein a mist ring spray outlet for spraying a vortex mist ring and a spray port for guiding a flame-shaped spray are formed in an upper part of the humidifier main body;

the spray port is arranged circumferentially on an outer side of the mist ring spray outlet;

the fan blade assembly comprises a driving motor and a fan blade connected to an output shaft of the driving motor;

the fan blade is arranged in proximity to an inner side of the mist ring spray outlet and is configured to extrude mist out of the mist ring spray outlet during rotation to form a vortex mist ring; and the atomization module, the fan blade assembly, and the control circuit board are electrically connected to each other;

wherein an air guide wall for guiding air is arranged circumferentially on the inner side of the mist ring spray outlet, and the fan blade is located on an inner side of the air guide wall.

2. The aromatherapy humidifier according to claim 1, wherein the upper part and/or a side wall of the humidifier main unit body are all or partially of a transparent or semi-transparent structure;

light-emitting diodes (LEDs) are attached to the control circuit board or an LED lamp for light emission is arranged inside the humidifier main unit body to form a flame spray effect together with spray at the spray port.

3. The aromatherapy humidifier according to claim 1, wherein the mist ring spray outlet is of a convex opening structure; and the spray port is of a concave opening structure.

4. The aromatherapy humidifier according to claim 1, wherein a sprayed mist guide bone for making mist sprayed out vertically upwards is arranged on the inner side of the spray port.

5. The aromatherapy humidifier according to claim 1, wherein the humidifier main unit body comprises an outer shell, an inner container located inside the outer shell, an air guide cover located at an upper part of the inner container, and an upper housing arranged at an upper part of the air guide cover;

the air guide cover is matched with a shape of the upper housing;

the upper housing is provided with a first opening and a second opening; the air guide cover is provided with a third opening and a fourth opening; the first opening is correspondingly matched with the third opening to form the mist ring spray outlet; the second opening is correspondingly matched with the fourth opening to form the spray port; and the atomization module is located at a bottom of the inner container.

6. The aromatherapy humidifier according to claim 5, wherein a motor compartment for accommodating the driving motor is further integrally molded in the inner container; and the control circuit board is located in an internal space enclosed by a bottom of the outer shell and the bottom of the inner container.

7. The aromatherapy humidifier according to claim 5, wherein an inner side of the air guide cover protrudes towards an upper side to form a first spherical protrusion; the third opening is formed at a top of the first spherical protrusion; the upper housing is also provided with a second spherical protrusion that is matched with the first spherical protrusion; and the first opening is formed in a top of the second spherical protrusion.

8. The aromatherapy humidifier according to claim 7, wherein the fourth opening is a through hole with a size smaller than a size of the first opening and a size of the third opening; and the fourth opening is arranged circumferentially on an outer side of the third opening.

9. The aromatherapy humidifier according to claim 1, wherein the humidifier main unit body is of a cylindrical structure.

* * * * *